Dec. 5, 1944.   J. FORMAN ET AL   2,364,063
HOLDER FOR WELDING ELECTRODES
Filed Dec. 21, 1942
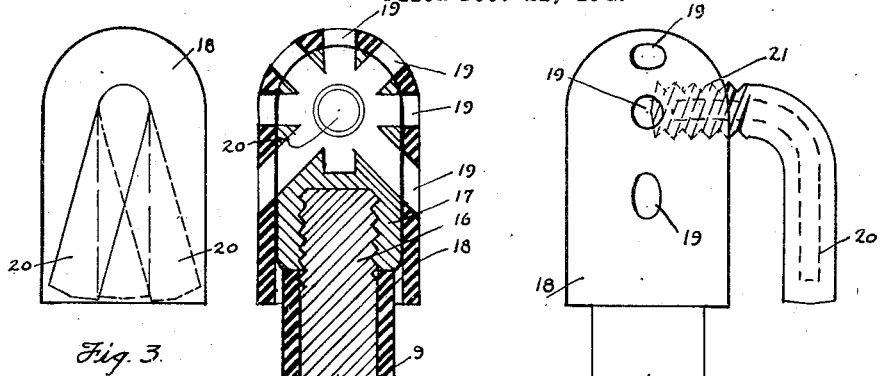
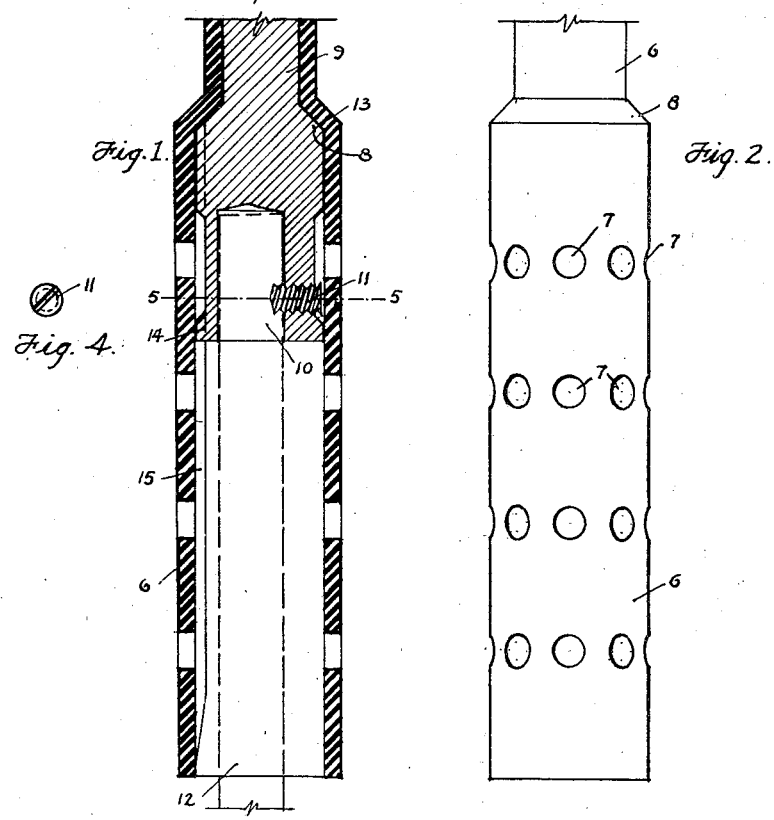
INVENTORS
James Forman
Andrew D. Clyburn
BY John H. Ruckman
attorney Patented Dec. 5, 1944

2,364,063

UNITED STATES PATENT OFFICE 2,364,063

HOLDER FOR WELDING ELECTRODES

James Forman and Andrew D. Clyburn, New Orleans, La.

Application December 21, 1942, Serial No. 469,772

5 Claims. (Cl. 219—8)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provision of the Act of April 30, 1928 (Ch. 460, 45 Stat. L. 467).

Our invention relates to holders for welding electrodes and welding rods. An object of the invention is to provide a device of this character for use in convenient and efficient burning of welding electrodes in the operation of electric welding with either alternating or direct current. Another object is to provide a device of this character which conserves electrodes by enabling them to be burned down short before replacement is necessary. Another object is to provide a device of this character in which the electrodes may be securely held so as to extend out at different angles which are best adapted to efficiently carry out the work in hand. Another object is to provide a device which the operator may handle safely.

The novel features, which we believe to be characteristic of our invention are set forth with particularity in the appended claims. The invention itself, however, both as to organization and method of operation, together with additional objects and advantages thereof, will be best understood from the following description of a particular embodiment of the invention when read in connection with the accompanying drawing in which:

Fig. 1 is a view of the device in central longitudinal section.

Fig. 2 is an elevational view of the device.

Fig. 3 is a detail view of the head of the device, taken at right angles to the position shown in Fig. 2.

Fig. 4 is a detail view of a set screw.

Fig. 5 is a view in cross section on the line 5—5 of Fig. 1.

Referring to the construction shown in the drawing for the purpose of illustrating the principles involved in the invention, the numeral 6 designates a cylinder of insulating material, the inward or hand portion of which is preferably provided with a plurality of holes or openings 7 in its side. This cylinder is provided with a shoulder 8 whereby a reduced outer portion is provided.

A conducting member 9 fits inside of the cylinder 6 and has a bore 10 in its inner end provided with a set screw 11 for attachment of a lead in wire 12. Beyond the set screw, the member 9 is provided with a shoulder 13 for engagement with the shoulder 8. The inward portion of the member 9 is provided with a key 14 for engaging in a keyway 15 formed in the inner surface of the cylinder 6. The outer end of the member 9 is provided with screw threads 16 for engagement by the internally threaded inward end of a cap 17 which is covered by an insulating hood 18. The cap 17 is provided with a plurality of holes 19 drilled into it at different angles. A welding electrode which may be of well known construction may have its inward end placed in any one of the holes according to which one best adapts the electrodes for the work which is being welded. An insulated angle clamp 20 has one end portion provided with threads for engagement in a screw threaded hole formed in the cap 17. This clamp is adapted to engage and firmly hold the electrode in place when the clamp is turned from dotted line position into the full line position shown in Fig. 3. The cap 17 when screwed down engages the outer end of the cylinder 6 and draws the shoulder 13 firmly into engagement with the shoulder 8 so that the parts of the device are held firmly together for use in the welding operation as previously set forth.

The advantages of this invention are summarized as follows:

(1) Simplicity of design and construction; few movable parts.

(2) Light in weight, can be handled by women welders of light stature, thereby less tiring and no loss of energy.

(3) Immovable contact connection thereby eliminating possibility of welding rod moving and creating an arc that would burn up holder head.

(4) Sound contact connection prevents oxidation, plus fusing of contact points, thereby permitting a constant flow of electric current.

(5) No detachable parts fastened by screws to hold insulation in its fixed position, thus making the holder current or shock proof.

(6) Abuse proof, as holder will withstand being cast aside or thrown down, without danger of damage as it is compact and completely insulated from end to end.

(7) Will permit the maximum use or burning down to within 1" of welding rods, thus creating a saving in valuable steel or electrodes.

(8) There are no movable parts to become loose.

(9) Improved method of making fast the lead current wires, to the holder, by a positive simplified set screw arrangement.
(10) Uninterrupted steady flow of current is made positive, through the lever handle contact fastener, thereby saving electric current.
(11) Cheapness of materials used in constructing the holder, thereby saving on the use of valuable metals now so urgently needed.
(12) Low cost of construction makes it possible to provide shipyards with a ready supply of holders on quick notice, thereby speeding up the shipbuilding program, because of the quick assembly.
(13) Conservation of welding rods because the extreme tip of the rod can only be inserted up to 1" in depth, whereas other type holders provide no check on this feature at all.
(14) Holder head permits rods to be held firmly at any and all angles, thereby making it possible to weld from any standing, kneeling, sitting or prone position of the operator.
(15) Holder head is arranged to take welding electrodes from sizes ⅛" up to ⁵⁄₁₆" diameter; thus we present a universal holder.
(16) Heads can be made to take larger or any special size electrodes desired without effecting the amperage resistance.
(17) Holder has no heavy spring jaw release or jaw opening device that tires the operator. Over the course of a working day and thus being unencumbered, it is made an easy working tool, as compared with other make holders.
(18) Due to the considerably less number of parts, the holder is firmly and sturdily made, and will withstand heavy abuse with a minimum of repairs or replacements.
(19) Holder weighs less than 24 ounces.
(20) The wholesale selling price will be considerably lower than any other type now on the market.
(21) Testimonials are in hand from practical experts showing the holder works efficiently and cheaply.
(22) Holder simplifies welding operation because of the easy and new method of holding the electrode in the hand in a fast position so that an apprentice of little training can perfect a weld.

We claim:

1. A holder for electric welding rods, said holder comprising a tubular member of insulating material having an interiorly arranged shoulder facing the lower end of said tubular member, a conducting member slidably and non-rotatably mounted within said tubular member and having an exteriorly arranged shoulder abutting said tubular member shoulder, the inner end of said conducting member being adapted for detachable connection with a lead-in wire passed through said lower end of said tubular member, the outer end of said conducting member extending beyond the upper end of said tubular member, a cap of conducting material having threaded engagement with the outer end of said conducting member and also having abutting engagement with said upper end of said tubular member to maintain said cap and members in rigidly assembled relation, said cap having at least one socket for receiving an end of a welding rod, and means having threaded engagement with said cap and adapted to engage said welding rod end and clamp the rod in said socket and to said cap.

2. An electric welding rod holder as defined in claim 1, wherein the tubular member has a portion of reduced internal and external diameters to provide the interior shoulder thereof, said reduced portion extending from said interior shoulder to the upper end of the tubular member.

3. An electric welding rod holder as defined in claim 1, wherein the cap is provided with a hood of insulating material that overlaps the upper end of the tubular member, said hood having an opening registering with the rod receiving socket of said cap.

4. An electric welding rod holder as defined in claim 1, wherein the cap has a plurality of angularly related and intersecting sockets arranged with their axes in a common plane which extends longitudinally of the holder, and a member for clamping a welding rod positioned in any one of said sockets to said cap, said clamping member having threaded engagement with said cap, having a handle, and having the inner end thereof adapted to engage a rod mounted in any socket of said cap at the intersection of said sockets.

5. A holder for electric welding rods, said holder comprising a tubular member of insulating material, a member of conducting material mounted within said tubular member, a cap member of conducting material mounted on an end of said conducting member extending beyond said tubular member, each of said members engaging both of the other two of said members to provide a rigid assembly of the three members, said cap having a plurality of intersecting sockets, each socket being adapted to receive an end of a welding rod, and a member having threaded engagement with said cap member and adapted to clamp a welding rod therein by engagement with the rod at the intersection of said sockets.

JAMES FORMAN.
ANDREW D. CLYBURN.